US008915084B2

(12) United States Patent
Rogers et al.

(10) Patent No.: US 8,915,084 B2
(45) Date of Patent: Dec. 23, 2014

(54) HEAT ENERGY EXTRACTION SYSTEM FROM UNDERGROUND IN SITU COMBUSTION OF HYDROCARBON RESERVOIRS

(75) Inventors: William H. Rogers, North Vancouver (CA); Michael J. Smith, Calgary (CA)

(73) Assignee: 7238703 Canada Inc., North Vancouver, British Columbia (CA)

( * ) Notice: Subject to any disclaimer, the term of this patent is extended or adjusted under 35 U.S.C. 154(b) by 273 days.

(21) Appl. No.: 13/415,488

(22) Filed: Mar. 8, 2012

(65) Prior Publication Data

US 2013/0234444 A1     Sep. 12, 2013

(51) Int. Cl.
*F03G 7/00*        (2006.01)

(52) U.S. Cl.
USPC ........................................... 60/641.2

(58) Field of Classification Search
CPC ............. F01K 7/00; F03G 7/00; C09K 8/592; Y02E 10/10; Y02E 10/14; Y02E 10/18; E21B 43/243
USPC ............................................. 60/641.2–641.4
See application file for complete search history.

(56) References Cited

U.S. PATENT DOCUMENTS

| | | | |
|---|---|---|---|
| 3,599,714 A * | 8/1971 | Messman et al. | 166/258 |
| 4,018,279 A | 4/1977 | Reynolds et al. | |
| 4,063,416 A | 12/1977 | Cooper | |
| 4,380,267 A | 4/1983 | Fox | |
| 4,491,367 A | 1/1985 | Tuval et al. | |
| 4,557,328 A * | 12/1985 | Birch | 166/256 |
| 5,054,551 A | 10/1991 | Duerksen | |
| 6,820,689 B2 * | 11/2004 | Sarada | 166/266 |
| 8,020,382 B1 * | 9/2011 | Zakiewicz | 60/641.2 |
| 2010/0132366 A1 * | 6/2010 | Lutz | 60/780 |
| 2010/0251728 A1 | 10/2010 | Uselton | |

FOREIGN PATENT DOCUMENTS

| | | |
|---|---|---|
| RU | 2023145 | 11/1994 |
| WO | WO 2011108005 | 9/2011 |

OTHER PUBLICATIONS

The THAI process, Petrobank Energy and Resources Ltd., Nov. 2009.
SPE/DOE 24200 Case History of South Belridge, California, In-Situ Combustion Oil Recovery, 1992.

* cited by examiner

*Primary Examiner* — Hoang Nguyen
(74) *Attorney, Agent, or Firm* — Oyen Wiggs Green & Mutala LLP (57) ABSTRACT

A system and method to extract heat energy from underground heat sources, then transport that heat to the surface in the form of a high temperature liquid or gas, and deliver the contaminant-free heat energy to a surface user of heat. The heat captured in the working fluid of the system is gained by heat transfers and can be extracted from the in situ combustion of any oil sands, heavy oil, conventional or unconventional oil, bitumen, coal, conventional or unconventional natural gas, methane or oil shales, or from various other sources. The invention creates a closed circulation system, in which the working fluid and steam circulating in the system are protected from any direct contact with the hydrocarbon reservoir, and gases produced by the in situ combustion are sequestered in the reservoir by the overlying overburden.

23 Claims, 2 Drawing Sheets

HEAT ENERGY EXTRACTION SYSTEM FROM UNDERGROUND IN SITU COMBUSTION OF HYDROCARBON RESERVOIRS

FIELD OF THE INVENTION

The invention pertains to systems that extract heat energy from the in situ combustion of hydrocarbon reservoirs and from other sources of subterranean heat, and deliver that heat energy to the surface for use in generating electric power and other applications requiring heat.

BACKGROUND OF THE INVENTION

As part of the large-scale electrical power generation in the United States and Canada, massive burning of hydrocarbon fuels is required for power plants that are fired by coal, oil or natural gas. It is generally accepted that serious environmental problems arise during the production of electric power using any of these hydrocarbon fuels, albeit some less than others. Greenhouse gases are generated and released into the atmosphere, and many other contaminants are brought to the surface and must be dealt with using expensive and sometimes ineffective processes.

With each step in the processes of extracting, refining, transporting and ultimately burning any hydrocarbon for use in a distant power plant or car, considerable damage is done to the environment. Each of these process steps is also expensive.

If contained hydrocarbon reservoirs were burned in situ underground, and only heat energy was extracted to the surface, and the heat energy was applied to generate electrical power, which was transmitted to the continental electricity grids, and then to electric cars, electric heating and electric-focused industries we would have a far more efficient and cost-effective energy system. If we could get more hydrocarbons usably available from each of our hydrocarbon resources we would make our overall hydrocarbon resources last longer. In so doing, if we could also eliminate greenhouse gases and other contaminants resulting from the recovery and use of hydrocarbons, we would help considerably in solving three major current world problems, namely, the need for cheaper energy, the need for more abundant and dispersed energy, and the need for much greater reductions in greenhouse gases emissions and contaminants.

It is known in the art of power generation to burn fossil fuels in situ underground and extract the heat energy to the surface. Examples in the patent literature include Reynolds et al., U.S. Pat. No. 4,018,279; Cooper, U.S. Pat. No. 4,063,416; Birch, U.S. Pat. No. 4,557,328; and Uselton, US 2010/0251728. However, the prior systems do not avoid the problems of environmental contaminants being transported to the ground surface, or combustion gases being released into the atmosphere, even though the burning occurs underground.

Successful in situ combustion of hydrocarbon reservoirs has been conducted since at least the early 1960's (see SPE/DOE 24200 Case History dated 1992 on South Belridge, Calif., In Situ Combustion Oil Recovery by Mobil Oil, which carried on the process for over 22 years in a heavy oil reservoir). Large scale steam turbine power plants have been around for nearly 100 years. It would be desirable to link these two old technologies—in situ combustion heat (or other forms of subterranean heat) and steam turbine power plants (or other commercial heat uses). In order to change the location of where and how hydrocarbons are burned, the main technology that has been missing is the ability to efficiently transfer heat energy from underground up to the surface to a user.

SUMMARY OF THE INVENTION

The invention provides a system and method to extract heat energy from underground heat sources, no matter how contaminated the source, then transport that heat to the surface in the form of a high temperature liquid or gas ("working fluid"), and deliver the contaminant-free heat energy to a surface user of heat. The heat captured in the working fluid of the system is gained by heat transfers and can be extracted from the in situ combustion of any oil sands, heavy oil, conventional or unconventional oil, bitumen, coal, conventional or unconventional natural gas, methane or oil shales, or from an existing or a still hot but expired SAGD (steam assisted gravity drainage), COGD (combustion overhead gravity drainage) or THAI (toe heel air injection) operation (collectively all such reservoirs or deposits are referred to as "hydrocarbon reservoirs"), or from volcanic magma vents and chambers that still contain significant heat ("volcanics"). Heat may also be derived from any form of accelerated enthalpic degradation ("AED") of a suitable deposit at depth. In situ combustion heat from a hydrocarbon reservoir, volcanics heat or AED deposit heat are all inclusively referred to herein as "subterranean heat" and all such types of such reservoirs or deposits are inclusively referred to herein as "subterranean reservoirs."

One aspect of the invention provides a system for extracting heat energy from an underground heat source. The heat source is one of a hydrocarbon reservoir, a calcareous deposit generating heat from accelerated enthalpic degradation, and a reservoir containing heat from past or on-going volcanics activity. The hydrocarbon reservoir is one which is undergoing, or has previously undergone, in situ combustion, or which contains heat energy from steam injection or any other form of heating. The system comprises (a) a wellbore comprising a first section extending from a ground surface through overburden to the heat source ("first section") and a second section extending from the first section generally within the heat source ("second section"); (b) a casing which lines the wellbore and has a sealed end in the second section of the casing, which together seal the interior of the casing; (c) a tubing within the casing extending through the first section and the second section of the wellbore, ending prior to the sealed end of the casing, and having an open end within the casing in the second section of the wellbore, the tubing having an outer diameter smaller than the inner diameter of the casing, defining a space between the outer surface of the tubing and the inner surface of the casing; (d) an apparatus near or at the surface for injecting a working fluid into one of (i) the space between the casing and the tubing or (ii) the tubing; and (e) an apparatus near or at the surface for receiving heated working fluid from the tubing or the space between the casing and the tubing.

One completed assembly of the parts comprising the invention is referred to herein as a "circuit", and a number of such assemblies as "circuits".

The heated working fluid is delivered to an apparatus fitting the needs of the end user and cooled working fluid will usually be delivered from the end user to the injection apparatus.

Where the heat source is a hydrocarbon reservoir undergoing in situ combustion, the in situ combustion usually requires one or more injection wells extending from the ground surface into the hydrocarbon reservoir for injecting a gas with oxidizing capability (an "oxidizing gas") to support combustion of the hydrocarbons, which injection wells are in configurations that enhance the functioning and efficiency of the related circuits.

Further aspects of the invention and features of specific embodiments are described below.

DETAILED DESCRIPTION OF THE PREFERRED EMBODIMENTS

The unique contribution of the invention is that it provides a universally adaptable means to connect any subterranean heat with any surface use that requires significant heat energy, including electric power generation, and industrial/commercial processes and heating applications. The system is easily adjusted for scale by increasing the number of circuits. In all applications the heat delivered is free of greenhouse gases and other contaminants. Carbon dioxide and other contaminants from the underground burning remain trapped in the underground heat source subterranean reservoir and are thus permanently sequestered. The invention uses no water (other than possibly to fill the pipes initially if water is to be the working fluid), uses no fracturing, can go miles deep in any direction, is environmentally clean, and in relative terms, is cheap.

The basic module of the invention, a "circuit," is an assembly of pipes inside a directionally drilled bore hole that extends from the surface into a target subterranean reservoir. A circuit comprises a pipe-within-a-pipe with a closed end or plug on the outside casing pipe near the end of the bore, but with no cap on the end of the inside pipe that extends close to the end of the outside casing pipe but with sufficient space to allow the contained working fluid to easily flow into the other pipe. At or near the surface the pipes will be attached to an apparatus that is appropriate for the process in which the heat is to be used—such as a boiler in a power plant, or a heat exchanger system through which it will deliver working fluid and heat. The working fluid of the system, with some heat extracted, will then be re-injected by an apparatus that is appropriate for the process and well known in the art, back down to the subterranean heat source to be re-heated. The working fluid within a circuit is virtually always circulating, first extracting heat in the down direction and then delivering heat in the up direction.

The piping assembly of a circuit creates a closed circulation system to move cooler working fluid through the burning or heated area of a subterranean reservoir to gain the desired heat by heat transfer and then return the heated working fluid to the surface without the working fluid inside the pipes ever being in direct contact with burning hydrocarbons or other subterranean contaminants. The invention system uses standard oilfield directional drilling to place circuits where needed. It also uses now-existing, off-the-shelf oil industry components in the piping. The piping system can easily be adapted to any new pipe product that may be created that is more appropriate for the combustion conditions. There should be at least that number of circuits collecting heat that, in combination, will provide all the heat requirements of the power plant or other chosen uses.

Circuits do not extract and transport oil or natural gas to the surface, but they could be used in concert with, and concurrently with, a hydrocarbon extraction or production system that utilizes in situ combustion or steam injection. Circuits are usually located in the upper portion of a deposit whereas production wells are located at the bottom and therefore circuits could collect heat and deliver it to any heat-needing process or user at the same time that production/extraction of a hydrocarbon was taking place. Such production systems include cyclic steam stimulation (huff-and-puff), THAI, SAGD and COGD. Similarly, because of the highly insulative nature of the thick overburden above, when any of these types of operations cease to be economic from a hydrocarbon extraction or production perspective, the reservoir will continue to have significant heat and fuel remaining in the reservoir that could support a further or on-going in situ combustion and heat extraction process that would likely last for considerable time.

With any subterranean reservoir in which in situ combustion in combination with circuits of the invention is being used to extract heat energy that is to be delivered to the surface, the layout and configurations of injection wells relative to the heat extraction circuits of the invention will be different than for a system designed to extract or produce petroleum substances, fluids or natural gas using in situ combustion. The objectives are very different. The present invention system uses in situ combustion to essentially burn all fuel in the whole of a reservoir, using circuits to capture heat and deliver the heat to the surface for as long as possible, and leave the resulting combustion and other gases and pollutants sequestered in the original reservoir.

An oil production or extraction system using in situ combustion, for example, is designed to burn what usually amounts to a small amount of the oil in the reservoir in order to heat and capture as much oil as possible and deliver that oil to the surface. When it can no longer produce economic amounts of oil from the reservoir, the air injection is shut down which stops the combustion. The oil that was produced will then be refined, transported and burned later, all of which stages create costs, pollutants and greenhouse gases. Usually more than 50%—often much more—of the hydrocarbons will be left in the reservoir as it cannot be extracted by current methods. This is a huge waste that arises from the focus on extracting the oil. The invention allows the potential use of the complete reservoir over an extended period of time with all pollutants or GHGs produced in the burning remaining sequestered.

Oil extraction/production systems that use in situ combustion plus gravity as the primary means to cause oil to migrate downwards (like THAI) configure slotted, open, parallel production pipes reasonably close to the bottom of the reservoir to collect oil that the heat causes to drop down from above. The injection system is structured to cause a fire front to advance over the array of collection/production pipes. In THAI for example, the production pipes are usually placed at 180 degrees from a row of injection wells so as to collect oil below as the fire front passes over each segment of their length.

When the present invention is being used the horizontal portions of the circuits may be arranged in parallel across one of the whole of a block of the reservoir that is to be burned (fuel block), or the whole of the reservoir. Depending on the consistency of slope in the roof of the block, circuits will be usually be located in the upper quarter to upper fifth of the block where the heat is generally greatest and earliest and will usually reside for the longest time.

The basic objectives when capturing heat for use in a power plant (or other major usage) are to cause the reservoir to last as long as possible while still capturing enough heat as is needed to run the attached power plant (or other use) for its economic life—usually 30 to 50 years. The required number of circuits needed to provide the heat required plus additional capacity for maintenance and failures may be laid out in parallel formations through the reservoir. If made necessary by reservoir configuration constraints, circuits could be layered, some above others. The initial requirement is to get the area of the reservoir where the circuits are located up to the desired temperature over a wide enough area that the circuits can supply the required quantity of heat to the surface. This is primarily accomplished by injecting a greater amount of the oxidizing gas (for example, air) initially, and then cutting back once heat is established until a balance is achieved between minimum burning relative to getting the required heat in the circuits. Continued injection of oxidizing gas is necessary to sustain combustion and the process is controlled by the location of injection wells and the amount of oxidizing gas injected. It will then become a process of modulating the rate of injections of oxidizing gas into various parts of the reservoir to cause the minimum burning required to maintain sufficient heat. Injection wells will usually be interspersed throughout the reservoir in number sufficient to cause the requisite heat to be produced and to reach the whole of the reservoir in time. Once commenced, it then becomes a process like very slow cooking, but lasting for decades.

Initial ignition to cause combustion in the reservoir may be accomplished in one of a number of ways known in the art. Depending largely on the depth and temperature of the reservoir, ignition may occur from only the injection of the oxidizing gas. Often the temperature in the vicinity of an injection well must be increased with injections of hot water or steam for a day or so and then it will usually ignite with the injection of oxidizing gas. There are also other methods known in the art.

Instrumentation, placed throughout the reservoir to measure temperatures, pressures and various gases ensures optimal use of the reservoir over a long period of time. The thickness of the reservoir will determine how many apertures are in each of the injection wells to inject oxidizing gas into the fuel block; however, more oxidizing gas will be directed at the bottom of the reservoir than at the top as heat and gravity will concentrate more fuel at the bottom and the hottest gases will concentrate at the top.

When all of the fuel in the reservoir is consumed and/or the air injection is shut down, the highly insulative nature of the thousands of feet of overburden will retain usable heat in the reservoir for a considerable time afterwards. This heat retention in the reservoir means that all circuits should have a useful economic life for an extended period after the fuel has been fully consumed. It also means that during most types of maintenance, heat would still be available to the circuits.

Waste or excess heat is virtually always present after all power generation stages or other cogeneration applications. Such waste heat could also be utilized to preheat injection oxidizing gas going into the reservoir, as heated injection air means less heat has to be created in the reservoir to maintain the desired reservoir temperatures. Since no GHGs or other pollutants are being brought to the surface by the circuits, by reinjecting the last of any heat not utilized, there is not even heat pollution being added to the atmosphere.

Figure 1:
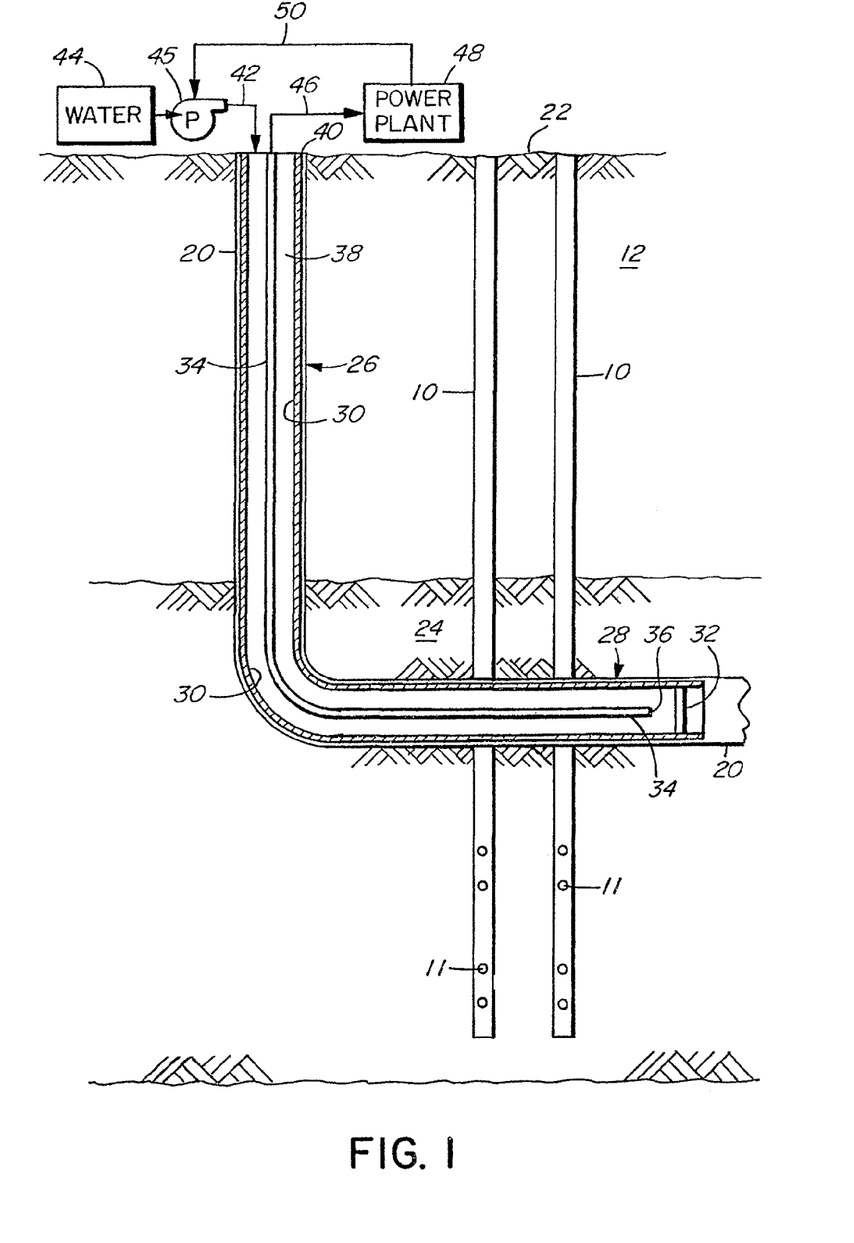
FIG. 1 is a schematic drawing, not to scale, of a single circuit of the system for extracting subterranean heat contained in a subterranean reservoir and delivering the heat that is captured in a working fluid to the surface to an apparatus that is appropriate for the surface user of the heat energy, in this case a power plant.
Figure 2:
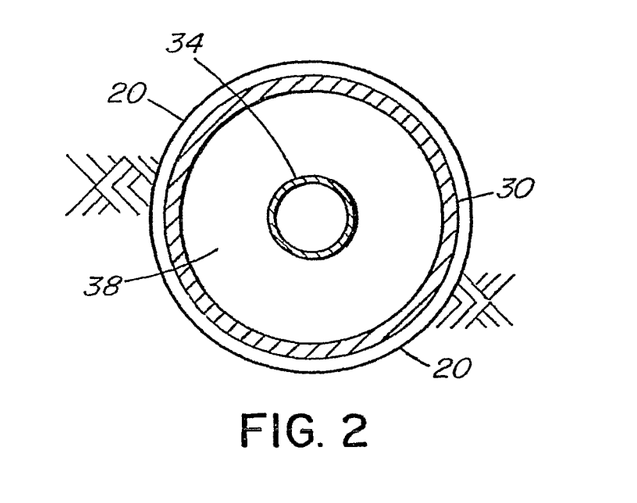
FIG. 2 is a schematic drawing, not to scale, of a cross-sectional view through the wellbore below any wellhead/surface hole, excepting at the farthest end of the circuit. Non-horizontal portions of the circuit will usually have cement injected between the borewall and the casing.
Figure 3:
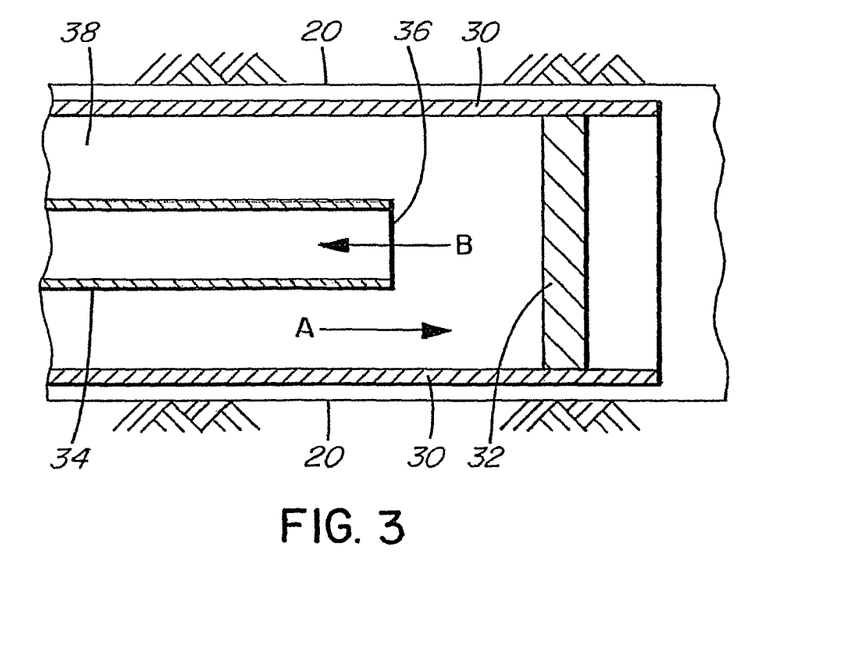
FIG. 3 is a schematic drawing, not to scale, of a detailed sectional view of the bottom end of the wellbore.

Referring now to the drawings, which show an embodiment of the invention delivering heat to a power plant as the user and in which the heat source is a hydrocarbon reservoir undergoing in situ combustion, a wellbore 20 extends from the ground surface 22 to the hydrocarbon reservoir 24, for example an oil sands reservoir, lying under overburden 12. The wellbore 20 comprises a first section 26 extending down to the desired depth and a second section 28 extending generally horizontally within the reservoir 24. The wellbore 20 is thus approximately L-shaped. The second section 28 will usually be located in the upper part of the hydrocarbon reservoir. The rock strata or overburden 12 comprises an adequate thickness of uncompromised rock cap to prevent leakage to the surface of the gases or liquids generated by combustion of the hydrocarbons (a "contained" reservoir).

The wellbore is lined with a casing 30 comprising pipe of size, thickness, strength and composition to reasonably satisfy the requirements of the conditions in which it is being placed (the "casing"). The bottom end of the casing, near the end of the borehole, is closed with a permanent plug 32. The casing and plug provide a sealed system whereby the interior of the casing is completely sealed from each strata through which the wellbore passes and from the burning hydrocarbons. The portion of the casing 30 that is within the first section 26 of the circuit will usually have cement inserted between the bore wall and the outside of the casing over its length, primarily to keep the casing in place. This cement will usually also have insulative qualities to reduce heat loss from the working fluid while it is moving though the lower temperatures prevalent throughout the overburden.

A second pipe, referred to herein as "tubing," 34 is inserted inside the casing from the ground surface through both sections of the wellbore, terminating in an open end 36, which is relatively near the casing plug 32. The tubing 34 is a pipe of size, thickness, strength and composition to reasonably satisfy the requirements of the conditions in which it is being placed. The tubing has an outer diameter that is smaller than the inner diameter of the casing, such that there is a space 38 between the tubing and the casing. Since the bottom end 36 of the tubing 34 is open, heated working fluid in the space 38 can flow freely into the tubing.

Injection wells 10 extend from the ground surface into the hydrocarbon reservoir and include suitable pumping apparatus at the surface. An oxidizing gas that supports combustion, e.g. air, is pumped down into the injection wells 10 and into the reservoir through outlet holes 11. The system may have a plurality of injection wells, arranged generally throughout the reservoir. FIG. 1 shows an exemplary two of what would typically be many injection wells 10, throughout the reservoir. The rate and location of combustion through the reservoir are controlled by the number and location of the injection wells, and by the quantity of and rate at which an oxidizing gas is injected through them into the reservoir.

Initial ignition, accomplished as described earlier, of the area of the reservoir adjacent to any one injection well, may or may not be necessary as heat in the reservoir rises.

In the vicinity of the wellhead 40, apparatus is provided for injecting cooler working fluid into the annular space between the tubing and the casing to be heated and for receiving heated working fluid from the tubing and using it to generate electricity or for heating, or other uses. In the preferred embodiment, working fluid is fed into the casing through the annular space 38 and heated working fluid is received at the ground surface from the tubing 34. As shown schematically in FIG. 1, the space 38 within the casing is connected by a conduit 42 to a working fluid source (usually water) 44 and an injection apparatus such as a pump 45, whereby working fluid is injected under pressure into the space 38. The tubing 34 is connected by conduit 46 to a power plant 48. The power plant may be any of several general designs of generating plants for converting steam or hot working fluid energy into electrical energy.

The type of plant will largely depend on heat transfer relationships throughout the whole process for a given reservoir, its depth and the scale and degree of heat available or needed for an extended period of time. The power plant may be connected to an electric power distribution grid, or may distribute electricity locally, or may be connected to just one or a few local large electrical/heat user plants or operations such as petroleum refining, chemical, forest products, aluminum, glass, metal casting, mining, and steel and oil sands operations.

The cooler residual steam or condensed water or other working fluid from the power plant is returned by a conduit 50 of type known in the art to the pump apparatus 45, for reinjection into the casing. Working fluid treatment apparatus (not shown) may be provided in the working fluid delivery circuit, to control rusting, scaling and other processes within the apparatus and pipes.

Where the working fluid is fully reused in the system, which is preferred, only occasional minimal make-up working fluid need be added from the working fluid source to make up for losses. Full reuse of working fluids can be accomplished using heat exchanger technologies of which there are many known within the art.

In some situations it may be advantageous to use working fluid directly in a process, in which case a replenishment/replacement of the working fluid would be continuously required to continue to use the system.

Part or all of the "waste heat", residual steam or condensed working fluid from the power plant may be put to secondary uses, such as heating facilities or processes. If desirable, waste heat could be used to heat oxidizing gas that is to be injected into the reservoir.

Boundary conditions for use of the invention will primarily relate to undertaking in situ combustion only in a "contained" reservoir—a reservoir that is deep enough that overburden will not fracture to the surface due to heat or pressure from below and that the structures surrounding the reservoir are stable. This ensures the permanent sequestering of all contaminants, including GHGs. The other key boundary condition is avoiding any damage to fresh water sources—aquifers and wells. It seems generally accepted that fresh water does not generally exist below 800 feet. Therefore any reservoirs to be used with the invention should preferably fit these basic criteria: be only in a contained deposit and ensure that there are no water complications by being considerably deeper than any fresh water possibility and ensuring that all completions and cementing are properly done to sequester the bore from any water.

Reservoirs chosen should at least contain sufficient burnable fuel to last for the economic life of the facility being matched to it, with safety margins built in. In prior art drilling, horizontal portions of wells are regularly exceeding 7500 feet and moving to exceed 10,000 feet. These may provide one possible constraint—a radius of the length of directional wells that can be drilled from the well pad. These are complicated wells with more than 30 fracks to be done in each of them. The horizontal wells for the present invention are much simpler as they have no fracks involved and therefore can likely be even longer than prior art wells. A long length of a circuit through an area of a reservoir being combusted is likely advantageous as it will ensure sufficient heat is provided to reheat the working fluid to the temperature desired within the time the circulating fluid is in the reservoir area.

The invention is used according to the following method. At the time of ignition at selected injection wells, an oxidizing gas is immediately and continuously pumped down the injection wells 10 causing continuing combustion of hydrocarbons in the selected parts of the hydrocarbon reservoir.

Within any one circuit, after ignition, working fluid is pumped down the wellbore casing in the space 38 by the pump 45. Within the second section 28 of the wellbore, the working fluid is heated by the burning hydrocarbons by means of heat transfer through the casing 30, forming steam (which will likely remain in the form of superheated working fluid while under pressure in the casing and tubing, until it reaches the ground surface). The heated working fluid flows into the tubing 34 through its open end 36, as indicated by the arrows A and B in FIG. 3, all without coming into any direct contact with the burning hydrocarbons and surrounding rock, and returns to the ground surface where it is directed to the power plant or is delivered to another adjacent use.

Injection wells will usually be relatively evenly distributed through the reservoir or a chosen fuel block of the reservoir. At the surface, injection wells may be pad drilled in several locations using directional drilling so as to concentrate injection equipment, controls and footprint. The second sections of directionally drilled injection wells are usually vertical within the reservoir. They may also be individually drilled vertically depending on whether footprint is a major consideration for the surface. The rate of combustion in the reservoir is primarily controlled by the rate of injection of oxidizing gas.

To cut down or stop combustion, the injection of oxidizing gas is reduced or stopped. When oxygen injection in an area of the reservoir is reduced there will be a lesser level of combustion, and if terminated all combustion will cease. Once adequate heat is produced to heat the circulating working fluid inside the casing to the desired temperature it should take less injection of oxidizing gas to maintain that heat level. Since there is very little heat escaping it requires a very minor amount of oxidizing gas from rotating injection wells to keep the reservoir simmering and the upper chamber of the reservoir, where circuits are normally located, sufficiently hot.

The injection of oxidizing gas is automatically controlled from a control room by the results coming from numerous instruments and gauges located through injection wells throughout the reservoir and possibly in the circuits as well. These gauges and instruments provide the control center with information on temperatures, various pressures, gas mixes and other pertinent information that is needed to understand what is happening in the reservoir and with wells and circuits.

A circuit of the invention can be constructed according to conventional techniques currently used for other purposes in the oil and gas industry. The bore 20 is drilled, using directional drilling for the horizontal section, and the casing 30 is inserted until it is near to the end of the bore leaving room for expansion within the bore, and the casing is then closed with the plug 32. The tubing 34 is then inserted.

The components at the top of the bore are cemented in place to withstand the pressures on the system and to seal the surface from underground contaminants and seal the reservoir from fresh water seepage. The wellhead and related safety and connection gear and methods are in accordance with applicable requirements and professional assessments of potential risks at the site and the end uses of the heated working fluid.

The system can be scaled up for greater heat production for larger end use requirements by providing multiple heat gathering circuits within the hydrocarbon reservoir sufficient to match the heat requirements of the electric power plant or other end use. For example, two or more wellbores as aforesaid may be provided, having respective first sections 26 and respective second sections 28 which may be arranged laterally-spaced in relation to each other within the hydrocarbon reservoir. Alternatively, the system can comprise two or more wellbore second sections 28 emanating from a single first section 26.

Suitable configurations for many circuits and injection wells working in concert are seen in the shale gas, shale oil and oil sands industries. For a massive heat user like a power plant, an oil refinery, oil sands production, pulp and paper or a petrochemical complex, a major requirement will usually be to have all of the first sections of circuits 26 terminate at the surface very near the plant and where the heat will be used. On the other hand in the reservoir second sections 28 of the circuits need to be spread out to methodically utilize the whole of the reservoir very efficiently over the economic lifespan of the surface facility—for example three to four decades, possibly more. All circuit drilling may start from one concentrated area very near where the plant will be located and be directionally drilled to the reservoir and then, usually within the upper portion of the reservoir, the second sections 28 be horizontally drilled to fit a methodical parallel pattern that best fits the dimensions of the reservoir. The plant should, if possible, be located somewhere close to the center of the long side of the reservoir. This allows horizontal second section 28 circuits to be drilled in two directions going away from the center. In this embodiment in a side view of the deposit, viewing from the building location, all of the first sections 26 of circuits would be going down and then approximately half of the second sections 28 of circuits would go horizontally to the right and half to the left.

Many combinations of layouts, lengths and distances between circuits would be reasonable and these will be largely determined by the characteristics of the reservoir, the factors affecting heat transfer rates through and between the materials and the lifespan of burning desired. Drilling of circuits could be staged over time in a very large reservoir. The prime difference from oil or gas or oil sands production systems is that the objective of the pipe-in-pipe invention is to extract heat in amount as is required to run the surface facility, and do it over a very long period of time. Unlike oil or gas or oil sands production systems this means that the second sections 28 of circuits within the reservoir 24 will generally be located in the upper parts of the reservoir, as that is where the heat will generally tend to concentrate. It also means that the number of circuits may be fewer for the same area, depending largely on the thickness of the reservoir. Circuits may be stacked one above another at different levels or in one level if the reservoir is narrow and long or is very thick.

The third big difference is that injection wells 10 will direct oxidizing gas—usually air—mostly to the bottom of the reservoir 24 as oil will continually drop to the bottom of the reservoir and it is a prime fuel. Heat from below will tend to rise. Gases will also be released and will tend to combust higher up in the reservoir.

Circuits of the invention may also be operated in conjunction with any hydrocarbon collection/production system that utilizes in situ combustion of hydrocarbons, such as the THAI or COGD systems. Circuits would be located in the upper portions of the reservoir while oil production is focused below. When it is uneconomic to produce oil efficiently, it is highly likely that there will continue to be sufficient fuel remaining in the reservoir to allow continued extraction of heat for some reasonable time afterwards. That will largely be determined by the need for heat at the surface and by the then prevailing price and demand for the hydrocarbons in the deposit.

To a lesser degree, but in the same manner, the invention also works in conjunction with an on-going SAGD operation. The invention will also work similarly in any adequate conventional or unconventional natural gas reservoir.

The invention will work similarly and extremely well in any adequate oil sands or heavy oil reservoir. A significant consideration in all cases will be depth and compactness of overburden to ensure that the reservoir is a contained structure that will retain all GHGs and other contaminants. With complete combustion of an oil sands or heavy oil deposit there is also some possibility of some surface subsidence when it is fully combusted if the overburden is not thick enough to absorb some caving in the empty reservoir as all that will remain is essentially dry sand with a loss of volume equal to the hydrocarbons extracted. The general estimate in the coal industry appears to be that 60% ceiling sloughing by volume will fill and support the overburden and thus the surface, if there is enough depth to the surface.

The pipe-in-pipe invention will also work in coal deposits to extract heat for surface uses from the in situ combustion of a coal deposit and leave the multitude of GHGs and contaminants sequestered in the deposit. The biggest considerations are: 1. to ensure the deposit is a "contained" deposit in order to permanently sequester of all GHGs and contaminants created from the burning of the deposit; 2. roof collapse of coal is highly likely during combustion of the coal comprising the deposit; and 3. a greater potential for surface subsidence exists with coal as the burned coal basically leaves ashes and a large volumetric void. As a result there may be roof collapses of the overburden. There will be a greater chance of surface subsidence if the overburden is not deep enough to provide for the 60% roof sloughing of roof material by volume needed to fill the void and thereby support the balance of the overburden prior to the caving reaching the surface.

If the coal seams are less than approximately 20 feet thick the invention methods used in other hydrocarbon deposits could reasonably apply. If the coal deposit is thicker than approximately 20 feet especially if it is 100 or more feet thick it may require more unique approaches. A system similar to the old "room and pillar mining" may be most effective. Interspersed vertical injection wells that end a few feet into the bedrock are used to give better stability. These injection wells will initially slowly burn out the "rooms." The second section horizontal pipes to collect heat would be laid out to be centered over the "pillars" near the top. This arrangement would still comprise the standard first and second wellbore sections of the invention. Eventually the pillars would be slowly burned until the reservoir slowly collapses—akin to the retreat mining often done in the final stages of room and pillar mining.

Like all other operations there must be a central control system to monitor temperatures, pressures, gases and other information and these will generally be collected by instruments placed through the injection wells.

The pipe-in-pipe invention will extract heat from heat reservoirs surrounding volcanic magma chambers or from vents where magma is present or where there is still sufficient heat remaining from prior volcanics activity. There are many magma chambers and vents within one to ten miles from the surface. One to five miles are within the range of current directional drilling technologies. With volcanics projects no injection wells are required as there is no in situ combustion being created to provide the heat source. One or more standard circuits are placed into or as close as possible to the heat source and to a maximum exposure of second section piping and the circulating working fluid to capture and extract the heat and deliver it to the surface. Directional drilling will be utilized to place circuits in or adjacent to a cooling magma vent, depending on how hot it is, in order to get as much exposure to heat as possible. Similarly, circuits may be placed close enough to a magma chamber to gain the heat needed. Circuits would be arranged as best possible to fit the shape of the heat source and extract sufficient heat to satisfy the requirements of the end use chosen at the surface. Moisture in the area should help initial heat transfers significantly.

The resulting heat can be applied as heat energy to power plants, industrial processes, heating or cooling of buildings or any other use requiring heat. Most countries near the "Rim of Fire" and other areas with volcanics generally do not have abundant hydrocarbon resources so this use of the invention gives an opportunity to generate abundant electric power from a heat source they may have.

Accelerated Enthalpic Degradation (AED) is a generation of heat in a deep formation of minerals that are capable of undergoing an enthalpic degradation reaction, such as calcareous rock—like calcium carbonate admixed with silicate minerals as is described in U.S. Pat. No. 4,492,367. The combination of suitable ignition, introduction of some reactants, such as carbon dioxide and water, and the great pressure at depth will cause what is a slow degradation at the surface to become artificially accelerated by several orders of magnitude. The primary result is the production of heat in the formation that will be of the order of at least 800 degrees C. Once initiated, the process does not require injections of water or an oxidizing gas, such as air. It will, however, produce its own carbon dioxide and water in situ as part of the on-going reactions. AED becomes self-sustaining, and once the formation is ignited will continue creating heat on its own for as long as a degradable mineral remains in the particular formation. The initial ignition well or wells could be subsequently converted to standard circuits.

The invention provides a superior method to capture and extract heat from an AED process that has been ignited. Because the process produces carbon dioxide, it must be a contained deposit so as to sequester the carbon dioxide and other contaminants produced by the reactions. Standard circuits are placed inside the deposit by directional drilling in number sufficient to provide more than the heat required to satisfy the heat energy requirements of the plant or facilities to which it is to be attached. Circuits may be placed in parallel in the upper levels of a deposit, where heat is expected to concentrate. Because water is produced from the reactions, heat transfers to the circuits will be simple.

Various modifications within the scope of the invention will be apparent to those skilled in the art. For example, the system can be configured with the flow directions in the casing and the tubing reversed, such that working fluid is injected into the tubing 34 and heated working fluid is returned through the space 38 between casing and tubing. The first section 26 of the wellbore need not be substantially vertical, nor the second section 28 substantially horizontal, as shown in the drawings: they can be arranged at other suitable angles, depending upon the properties of a particular site, the object being for the first section to extend down to the subterranean reservoir and for the second section to extend through the reservoir. The working fluid does not have to be water and can comprise other liquids or gases that can capture and transport subterranean heat to the surface.

The casing and tubing can be made of materials other than steel. There may optionally be cementing of the space between the casing and the borehole for all or part of the casing length. Relative to standard oilfield cement, circuit cement may optionally have extra conductive properties in the reservoir area or extra insulative properties in overburden area. The placement of circuits within a reservoir relative to the top or bottom of the reservoir will vary depending on the thickness and configuration of the reservoir and the support that may be expected for the circuit pipes during the latter stages of combustion.

The system can be used for applications other than the generation of electricity. Like electric power generation, all other industries that essentially heat a boiler to generate steam or hot water for their operations could more efficiently and with no GHGs or contaminants produced from the heat used, generate the same steam or hot water using subterranean heat extracted by the circuits of the invention from subterranean reservoirs. These industries include SAGD and most other oil sands production/extraction processes and operations. Similarly, all industries that use heat energy to directly raise the temperature of components in their manufacturing process—process heating—like refining crude oil, could also more efficiently and with no GHGs or contaminants produced from the heat used, generate the same heat energy using subterranean heat extracted by the circuits of the invention from subterranean reservoirs.

Natural gas and oil, plus electricity (which is largely generated by natural gas, coal and oil), are relied upon in industry and manufacturing as the source of their energy for virtually all processes and operations. The biggest energy users are the chemical, oil sands, forest products and petroleum refining industries, as well as aluminum, glass, metal casting, mining and steel industries (all together, the "large user industrials"). These industries consume approximately 75% of all the energy used by all industries. As a result of GHGs and other pollutants released in transporting, storing and then burning hydrocarbons used in the various parts of the processes of producing their products, these large user industrials, plus the energy production/extraction industry, also cause by far the greatest releases of pollutants and GHGs.

Over-all societal strategies should be designed to dramatically reduce the release of GHG's and other contaminants, to reduce the over-all costs of energy, and to get maximum utilization from resources being used. These would require, by law or by incentives, that large user industrials locate adjacent to subterranean reservoirs so that the electricity or heat used in their processes can be provided most efficiently and with the least release of GHGs and other pollutants.

The preferred energy strategy from an efficiency of resource use perspective, the general cost of producing energy perspective and the environmental perspective would be to produce massive amounts of electricity from heat derived from the in situ combustion of subterranean reservoirs and transmit that electrical power to industries, homes and cars to use, in substitution for much of the "dirty energy" now used in these processes and operations. This requires the use of the circuits of the invention to extract the heat from below and deliver the clean heat to the surface to the power generation plants, or to the industrial/manufacturing facilities.

The invention claimed is:
1. A system for extracting heat energy from an underground hydrocarbon reservoir and delivering heat energy to a surface user, comprising:

(a) a wellbore comprising a first section extending from a ground surface through overburden to the reservoir and a second section extending from the first section generally within the reservoir;

(b) a casing which lines the wellbore and has a sealed end in the second section of the wellbore, the interior of the casing being sealed;

(c) a tubing within the casing extending through the first section and the second section of the wellbore, ending prior to the sealed end, and having an open end within the casing in the second section of the wellbore, the tubing having an outer diameter smaller than the inner diameter of the casing, defining a space between the outer surface of the tubing and the inner surface of the casing;

(d) an apparatus for injecting a working fluid into one of (i) the space between the casing and the tubing or (ii) the tubing; and (e) an apparatus for receiving heated working fluid from the tubing or the space between the casing and the tubing.

2. A system according to claim 1, wherein the hydrocarbon reservoir is undergoing in situ combustion.

3. A system according to claim 2, wherein the hydrocarbon reservoir is further undergoing hydrocarbon extraction or production.

4. A system according to claim 1, wherein the hydrocarbon reservoir has previously undergone in situ combustion.

5. A system according to claim 1, wherein the hydrocarbon reservoir contains heat energy from steam injection heating.

6. A system for extracting heat energy from the underground combustion of hydrocarbons, comprising:

(a) a wellbore comprising a first section extending from a ground surface through overburden to an underground hydrocarbon reservoir and a second section extending from the first section generally within the hydrocarbon reservoir;

(b) one or more oxidizing gas injection wells extending from the ground surface into the hydrocarbon reservoir for injecting an oxidizing gas to support combustion of the hydrocarbon reservoir;

(c) a casing which lines the wellbore and has a sealed end in the second section of the wellbore, the interior of the casing being sealed;

(d) a tubing within the casing extending through the first section and the second section of the wellbore, ending prior to the sealed end, and having an open end within the casing in the second section of the wellbore, the tubing having an outer diameter smaller than the inner diameter of the casing, defining a space between the outer surface of the tubing and the inner surface of the casing;

(e) an apparatus for injecting a working fluid into the space between the casing and the tubing; and (f) an apparatus for receiving heated working fluid from the tubing.

7. A system for extracting heat energy from the underground combustion of hydrocarbons, comprising:

(a) a wellbore comprising a first section extending from a ground surface through overburden to an underground hydrocarbon reservoir and a second section extending from the first section generally within the hydrocarbon reservoir;

(b) one or more oxidizing gas injection wells extending from the ground surface into the hydrocarbon reservoir for injecting an oxidizing gas to support combustion of the hydrocarbon reservoir;

(c) a casing which lines the wellbore and has a sealed end in the second section of the wellbore, the interior of the casing being sealed;

(d) a tubing within the casing extending through the first section and the second section of the wellbore, ending prior to the sealed end, and having an open end within the casing in the second section of the wellbore, the tubing having an outer diameter smaller than the inner diameter of the casing, defining a space between the outer surface of the tubing and the inner surface of the casing;

(e) an apparatus for injecting a working fluid into the tubing; and (f) an apparatus for receiving heated working fluid from the space between the casing and the tubing.

8. A system according to claim 1, wherein a space between the wellbore wall and the casing exterior within the first section comprises cement or other material providing heat insulation.

9. A system according to claim 1, wherein a space between the wellbore wall and the casing exterior within the second section comprises cement or other material providing heat absorbency.

10. A system according to claim 2, further comprising one or more oxidizing gas injection wells extending from the ground surface into the hydrocarbon reservoir for injecting an oxidizing gas to support and control in situ combustion of the hydrocarbon reservoir.

11. A system according to claim 1, further comprising a heat exchange apparatus at or near the ground surface to extract heat from the heated working fluid.

12. A system according to claim 1, wherein the first section is substantially vertical and the second section is substantially horizontal.

13. A system according to claim 1, in combination with a power plant for converting the heated working fluid into electricity.

14. A system according to claim 1, in combination with further apparatus for converting the heated working fluid into heat or electricity.

15. A system according to claim 14, wherein the heat or electricity is for use to:
(a) generate steam, hot water or other hot liquid,
(b) raise the temperature of components in a manufacturing or industrial process,
(c) raise the temperature of one or more apparatuses used in a manufacturing or industrial process, or
(d) a combination of these.

16. A system according to claim 1, wherein the working fluid in the circuit comprises a liquid.

17. A system according to claim 1, wherein the working fluid in the circuit comprises water.

18. A system according to claim 1, wherein the working fluid in the circuit comprises a gas.

19. A system according to claim 1, wherein the casing is cemented to the wellbore sides along part or all of the length of the casing.

20. A system according to claim 1, wherein the hydrocarbon reservoir comprises oil sands, heavy oil, bitumen, conventional or unconventional oil or natural gas, coal or oil shales.

21. A method for generating heat by the underground combustion of hydrocarbons, comprising the steps of:
(a) providing a wellbore comprising a first section extending from a ground surface through overburden to an underground hydrocarbon reservoir and a second section extending from the first section generally within the hydrocarbon reservoir, a casing which lines the wellbore and has a sealed end in the second section of the casing, the interior of the casing being sealed, and a tubing within the casing extending through the first section and the second section of the wellbore, ending prior to the sealed end, and having an open end within the casing in the second section of the wellbore, the tubing having an outer diameter smaller than the inner diameter of the casing, defining a space between the outer surface of the tubing and the inner surface of the casing;

(b) injecting an oxidizing gas into the hydrocarbon reservoir for supporting combustion of the hydrocarbon and burning the hydrocarbon, while naturally sequestering contaminants produced by the combustion in the reservoir under the ground surface;

(c) injecting a working fluid into one of (i) the space between the casing and the tubing, and (ii) the tubing;

(d) heating the working fluid in the second section of the casing by the burning of the hydrocarbon; and (e) receiving heated working fluid from the casing at the ground surface.

22. A method according to claim 21, further comprising using the heated working fluid to produce electricity.

23. A method according to claim 21, further comprising using the heated working fluid for an industrial process or for heating.

* * * * *